United States Patent
Choi et al.

(10) Patent No.: US 7,518,682 B2
(45) Date of Patent: Apr. 14, 2009

(54) ROLL STOCKER AND METHOD FOR FABRICATING LIQUID CRYSTAL DISPLAY DEVICE USING THE SAME

(75) Inventors: Byoung Chul Choi, Gyeonggi-Do (KR); Jung Seung Kim, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 280 days.

(21) Appl. No.: 11/477,813

(22) Filed: Jun. 30, 2006

(65) Prior Publication Data

US 2007/0153220 A1 Jul. 5, 2007

(30) Foreign Application Priority Data

Dec. 29, 2005 (KR) ...................... 10-2005-0134390

(51) Int. Cl.
*G02F 1/1337* (2006.01)
*G02F 1/13* (2006.01)

(52) U.S. Cl. ...................................... 349/126; 349/187

(58) Field of Classification Search ........................ None
See application file for complete search history.

(56) References Cited

U.S. PATENT DOCUMENTS

| | | | | |
|---|---|---|---|---|
| 5,455,695 A | * | 10/1995 | Kodera et al. ................ | 349/126 |
| 7,242,450 B2 | * | 7/2007 | Mizoguchi ................... | 349/126 |
| 2004/0198182 A1 | * | 10/2004 | Kuan et al. .................... | 451/5 |
| 2005/0018116 A1 | * | 1/2005 | Ishizuka et al. .............. | 349/117 |
| 2006/0012740 A1 | * | 1/2006 | Kuan et al. ................... | 349/126 |
| 2007/0153183 A1 | * | 7/2007 | Choi et al. .................... | 349/124 |
| 2007/0153220 A1 | * | 7/2007 | Choi et al. .................... | 349/187 |
| 2008/0002137 A1 | * | 1/2008 | Kim et al. .................... | 349/187 |

* cited by examiner

*Primary Examiner*—Michelle R Connelly Cushwa
(74) *Attorney, Agent, or Firm*—McKenna Long & Aldridge LLP

(57) ABSTRACT

A roll stocker and a method for fabricating a liquid crystal display device using the same are disclosed. The roll stocker is constructed by multi-stage, of which roll keeping units of an upper stage can be moved left and right so that a rubbing roll at the lower stage can be easily taken out. Thus, space utilization can be enhanced and rolls can be stably kept. The roll stocker formed by two stages includes an upper stage installed at an upper side of a lower stage used as a support; a plurality of roll keeping units positioned at the upper and lower stages and keeping rubbing rolls; and a moving unit installed between the upper and lower stages and moving the roll keeping units of the upper stage.

11 Claims, 7 Drawing Sheets

US 7,518,682 B2

ROLL STOCKER AND METHOD FOR FABRICATING LIQUID CRYSTAL DISPLAY DEVICE USING THE SAME

This application claims the benefit of the Korean Patent Application No. 10-2005-0134390 filed on Dec. 29, 2005, which is hereby incorporated by reference for all purposes as if fully set forth herein. This application incorporates by reference co-pending application, Ser. No. 10/184,096, filed on Jun. 28, 2002 entitled "SYSTEM AND METHOD FOR MANUFACTURING LIQUID CRYSTAL DISPLAY DEVICES FROM LARGE MOTHER SUBSTRATE PANELS"; and co-pending application Ser. No. 11/476,919, filed on Jun. 29, 2006, entitled "METHODS OF MANUFACTURING LIQUID CRYSTAL DISPLAY DEVICES" for all purposes as if fully set forth herein.

BACKGROUND OF THE INVENTION

1. Field of the Invention

The present invention relates to a roller stocker and a method for fabricating a liquid crystal display (LCD) device and, more particularly, to a roll stocker corresponding to various models of mother substrates and to keeping a sufficient number of rubbing rolls for securing a margin for roll operation, and a fabrication method of a liquid crystal display (LCD) device using the same.

2. Description of the Related Art

As the consumer's interest in information displays is growing and as the demand for portable (mobile) information devices increases, research and commercialization of light and thin flat panel displays ("FPD") has increased. Flat panel displays may replace the Cathode Ray Tube ("CRT"), which is a common existing display device.

The liquid crystal display ("LCD") device is a FPD device for displaying images using optical anisotropy of liquid crystal. LCD devices exhibit excellent resolution and color and picture quality, so it is widely applied for notebook computers or desktop monitors, and the like.

In the LCD device, a data signal according to image information is separately supplied to liquid crystal cells arranged in a matrix form and light transmittance of the liquid crystal cells is controlled for displaying the desired image.

FIG. 1 is an exploded perspective view illustrating the structure of a LCD device.

As illustrated in FIG. 1, the LCD device includes a color filter substrate 5, namely, a first substrate, an array substrate 10, namely, a second substrate, and a liquid crystal layer 40 formed between the color filter substrate 5 and the array substrate 10.

The color filter substrate 5 includes a color filter (C) comprising sub-color filters 7 for implementing red (R), green (G) and blue (B) color, a black matrix 6 for discriminating the sub-color filters 7 and blocking light transmitting through the liquid crystal layer 40, and a transparent common electrode 8 for applying a voltage to the liquid crystal layer 40.

The array substrate 10 includes gate lines 16 and data lines 17 that are arranged on the substrate 10 and define pixel regions (P). A thin film transistor (TFT) switching element is formed at respective crossings of the gate lines 16 and the data lines 17, and a pixel electrode 18 is formed at each pixel region (P).

The pixel region (P) is a sub-pixel corresponding to one sub-color filter 7 of the color filter substrate 5, and a color image is obtained by combining the red, green and blue types of sub-color filters 7. Namely, the three red, green and blue sub-pixels form one pixel, and TFTs are connected to the blue, green and blue sub-pixels.

An alignment film (not illustrated) for aligning liquid crystal molecules of the liquid crystal layer 40 is formed on the color filter substrate 5 and the array substrate 10.

FIG. 2 illustrates a method for forming an alignment film using a roll printing method.

As illustrated, generally, an alignment film is formed using a printing method using a plurality of rolls. Namely, an alignment solution 24 supplied between a cylindrical anylox roll 22 and a cylindrical doctor roll 23 is uniformly coated entirely on the anylox roll 22 as the anylox roll 22 and the doctor roll 23 are rotated. In this case, the alignment solution 24 is supplied by a dispenser 1 in an injector type.

The anylox roll 22 is rotated in contact with a printing roll 24 having a rubber plate 25 attached on a certain region of its surface, thereby transferring the alignment solution 29 on the anylox roll 22 to the rubber plate 25. The rubber plate 25 corresponds to a substrate 26 on which the alignment solution 29 is to be coated, and has a master pattern to allow the alignment film to be selectively printed on the substrate 26.

As a printing table 27 with the substrate 26 loaded thereon is moved in contact with the printing roll 24, the alignment solution 29 which has been transferred to the rubber plate 25 is re-transferred onto the substrate 26 to thereby form an alignment film.

Next, with the alignment film formed on the substrate, the alignment film is rubbed to arrange liquid crystals in a certain direction to form valleys in a certain direction.

FIG. 3 is a perspective view illustrating a rubbing process.

As illustrated, the alignment film 21 is rubbed to form recesses 36 on the surface thereof. The rubbing process rubs the surface of the alignment film 21 in a certain direction using a roller 30 with a rubbing cloth 35 wound thereon.

After the surface of the alignment film 21 is rubbed, it has fine recesses 36.

For the rubbing cloth 35, a soft cloth is used. The rubbing equipment, including the roller 30, is relatively simple. The basic part for setting conditions for the rubbing process is setting a rubbing condition with a suitable strength and applying a uniform rubbing strength on a large area.

If the rubbing is not uniformly performed, an alignment degree of liquid crystal molecules is not spatially uniform, causing a defect that optical characteristics are different at a certain portion.

In addition, since the physical units such as the rolls are used in the rubbing process, management of the rolls is important with respect to stability of processes. Accordingly, it is important to secure a sufficient number of rubbing rolls to obtain a margin in operating rolls. However, there is no means for keeping the rubbing rolls, and the rubbing rolls are kept standing vertically, limiting the operation of rolls. In addition, as the size of the mother substrate for fabricating a liquid crystal display panel increases, the corresponding rubbing roll lengthens, so there is a limitation on keeping rubbing rolls in a standing state in a limited clean room.

SUMMARY OF THE INVENTION

Therefore, one aspect of the present invention involves the recognition by the present inventors of the drawbacks in the related art as explained above. In order to address such problems, the present invention provides a roll stocker capable of coping with mother substrates of various models and keeping the sufficient number of rubbing rolls in storage by multi-stage to obtain a margin in operating rolls and a method for fabricating a liquid crystal display (LCD) device.

One feature of the present invention is to provide a roll stocker formed by two stages including: an upper stage installed at an upper side of a lower stage used as a support; a plurality of roll keeping units positioned at the upper and lower stages and keeping rubbing rolls; and a moving unit installed between the upper and lower stages and moving the roll keeping units of the upper stage.

Another feature of the present invention is to provide a method for fabricating an LCD device including: providing mother substrates each having a plurality of array substrates or a plurality of color filter substrates formed thereon; performing an array process on the array substrates and performing a color filter process on the color filter substrates; forming an alignment film on a surface of the mother substrate; performing rubbing on the mother substrate with the alignment film formed thereon using a rubbing equipment; taking out a required rubbing roll from a roll stocker, which includes an upper stage installed at an upper side of a lower stage used as a support, a plurality of roll keeping units positioned at the upper and lower stages and keeping rubbing rolls and a moving unit installed between the upper and lower stages and moving the roll keeping unit of the upper stage, in order to replace an existing rubbing roll, as necessary, and continuously performing a rubbing process; attaching the pair of rubbing process-finished mother substrates; and cutting the attached mother substrates into a plurality of unit liquid crystal display panels.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The roll stocker and a method for fabricating an LCD device in accordance with embodiments of the present invention will be described with reference to the accompanying illustrations.

Figure 1:
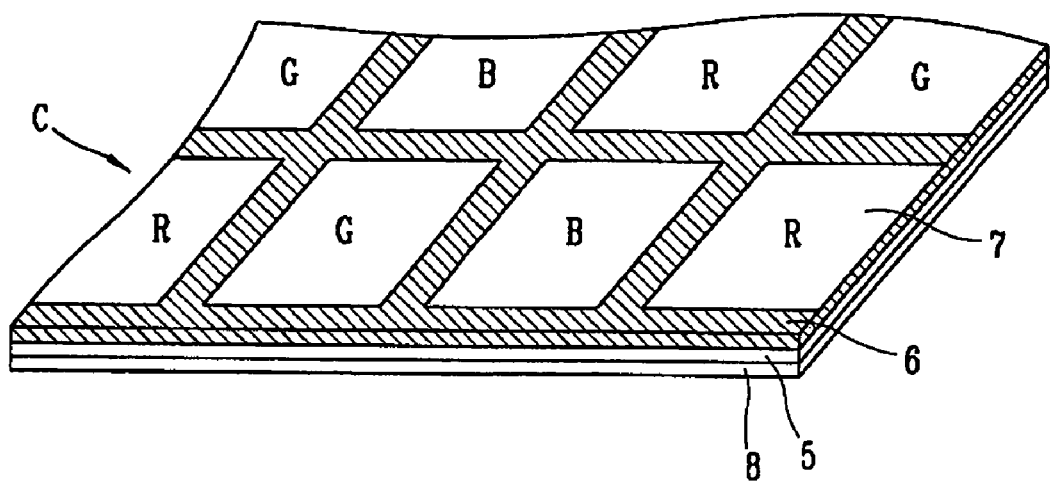
FIG. 1 is an exploded perspective view illustrating the structure of a LCD device.
Figure 1:
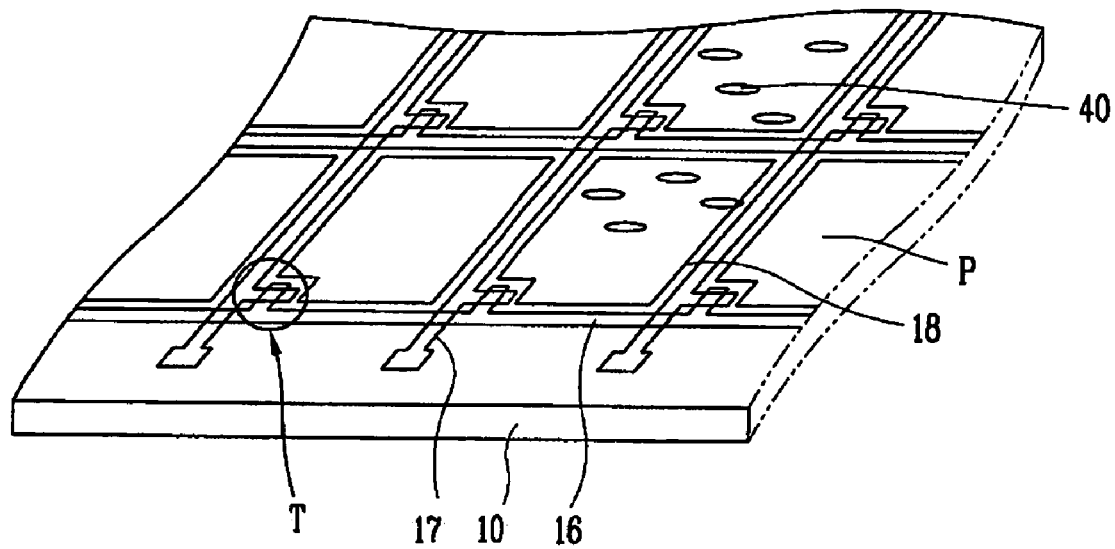
Figure 2:
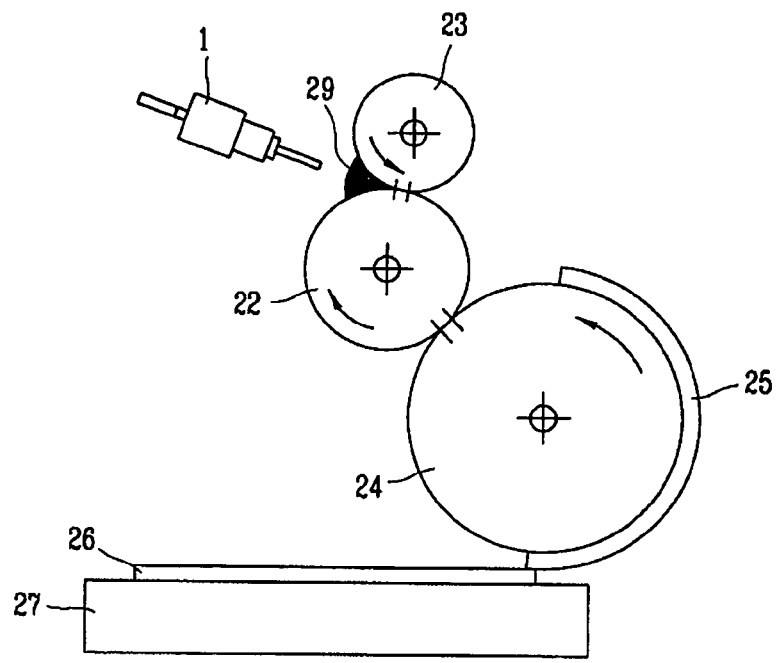
FIG. 2 is a view illustrating a method for forming an alignment film using a roll printing method.
Figure 3:
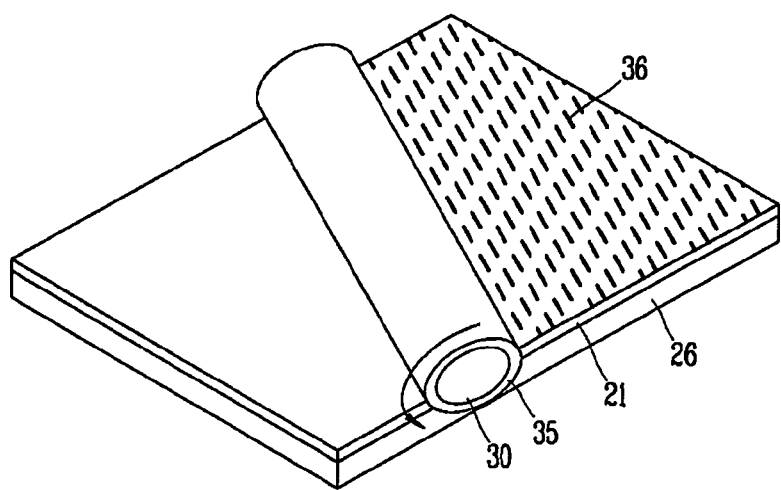
FIG. 3 is a perspective view illustrating a rubbing process.
Figure 4:
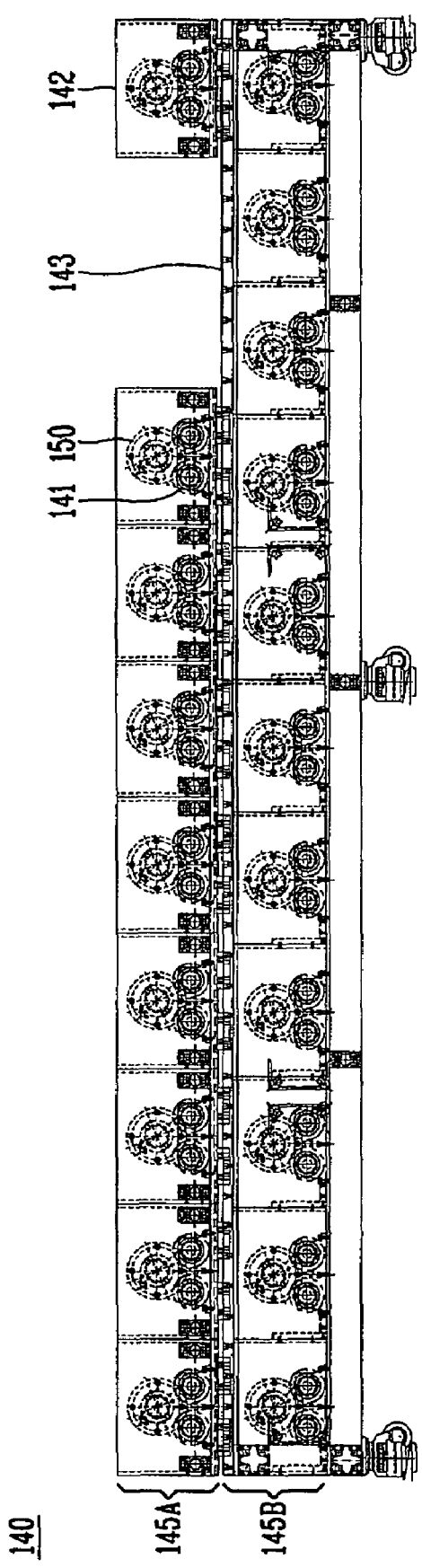
FIG. 4 is an exemplary view illustrating a roll stoker in accordance with the present invention.
Figure 5:
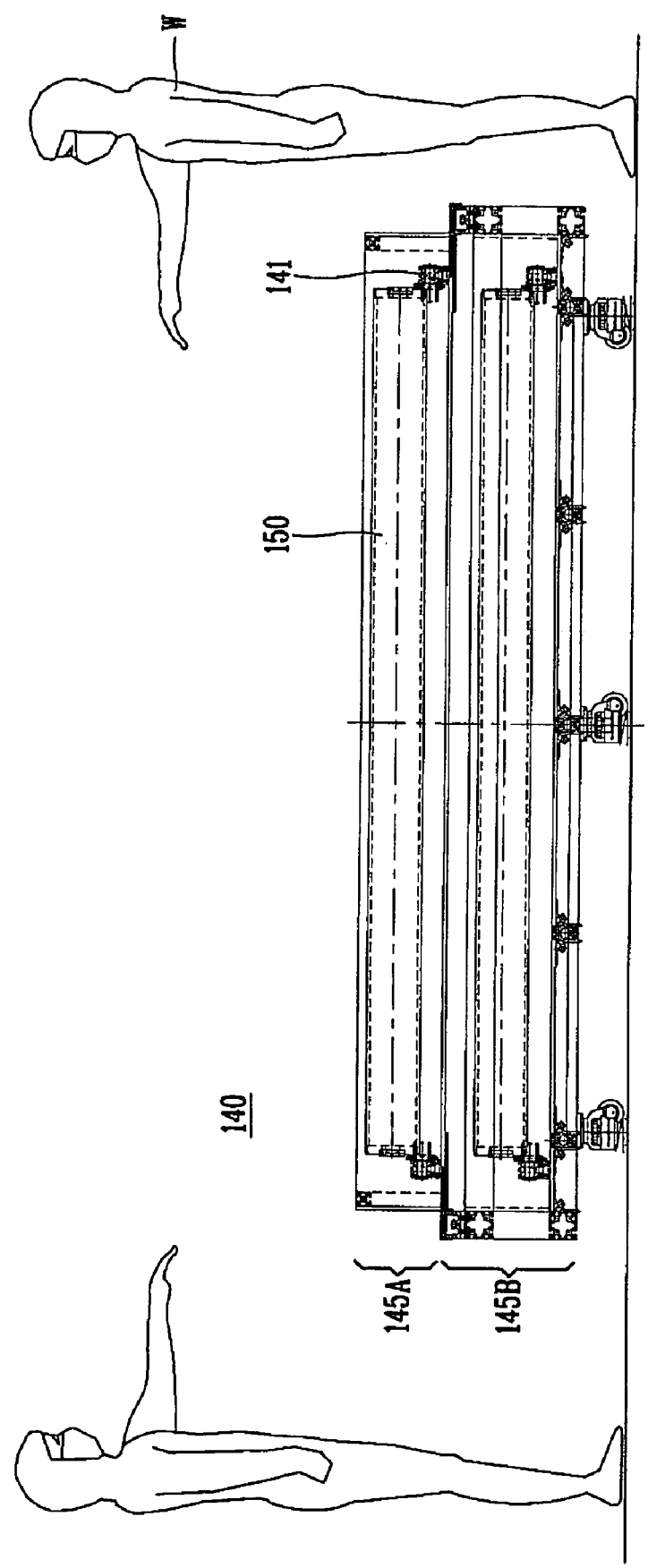
FIG. 5 illustrates the roll stocker in FIG. 4 viewed from the side.

FIGS. 4 and 5 are exemplary views illustrating a roll stocker in accordance with the present invention. Specifically, FIG. 4 is a front view of the roll stocker for keeping rubbing rolls, and FIG. 5 is a side view of the roll stocker in FIG. 4.

As illustrated, in the present invention, a roller stocker 140 is constructed of two stages including an upper stage 145A and a lower stage 145B, each having a plurality of roll keeping units 142 for keeping the sufficient number of rubbing rolls 150 in the same space. The present invention is not limited thereto and the roll stocker 140 can be constructed by multi-stage of three or more stages.

The rubbing rolls 150 are kept in roll keeping units 142 of the upper stage 145A and the lower stage 145b in a horizontal direction, and a rotatable roller 141 is installed at a lower portion of the roll keeping units 142 to prevent the robbing rolls 140 kept in the roll keeping units 142 from sagging. Namely, the rubbing roll 150 is kept such that both end portions thereof are laid on the upper surface of the pair of rollers 141, and in this case, the pair of rollers 141 are periodically rotated to prevent the central portion of the rubbing roll 150 from sagging.

As the size of the rubbing roll 150 increases, the importance of management of the rubbing roll 150 increases, and a sufficient number of rubbing rolls 150 should be secured to maintain stability and continuity in the manufacturing process. In addition, when a mother substrate for fabricating a liquid crystal display panel of a different model is introduced to the rubbing line, a different type rubbing roll 150 should be used that corresponds to the model of the liquid crystal display panel. Accordingly, accordingly, a sufficient number of rubbing rolls 150 must be secured according to the various models. In this case, the sufficient number of rubbing rolls 150 of various types is kept in the multi-stage roll keeping units 142 to obtain a margin in operating rolls and thus contribute to process stability.

In this embodiment of the present invention, since the roll stockers 140 are constructed such that the upper stage 145A is installed using the roll keeping units of the lower stage 145B as a support, a clean room of a given size can be more effectively used. In addition, the roll stocker 140 is relatively light and thus it can be easily moved in spite of the increase in the size of the rubbing rolls 150.

An operator (W) of the roll stocker 140 removes the rubbing roll 150 required for a rubbing operation in a vertical direction from the roll keeping unit 142. Namely, for example, two operators (W) may approach the roll keeping unit 142 that keeps the rubbing roll 150, hold both end portions of the rubbing roll 150 and then lift them in the vertical direction to thereby take out the rubbing roll 150.

In this case, when a required rubbing roll 150 is positioned at the lower stage 145B of the roll stocker 140, in order to take it out, a roll keeping unit 142 of the upper stage 145A positioned at the upper side of the required rubbing roll 150 must be moved. In this case, the roll stocker 140 is formed such that a moving unit such as a rail 143 is installed at an upper side of the roll keeping unit 142 of the lower stage 145B and the upper stage 145A has an empty space where the roll keeping unit 142 is not positioned, whereby the roll keeping unit 142 of the upper stage 145A can be moved in a horizontal direction. Accordingly, the roll keeping unit 142 of the upper stage 145A can be moved to an empty space in the horizontal direction and the required rubbing roll 150 of the lower stage 145B can be taken out upwardly.

A method for fabricating an LCD device using the roll stocker constructed as described above will be described.

Figure 6:
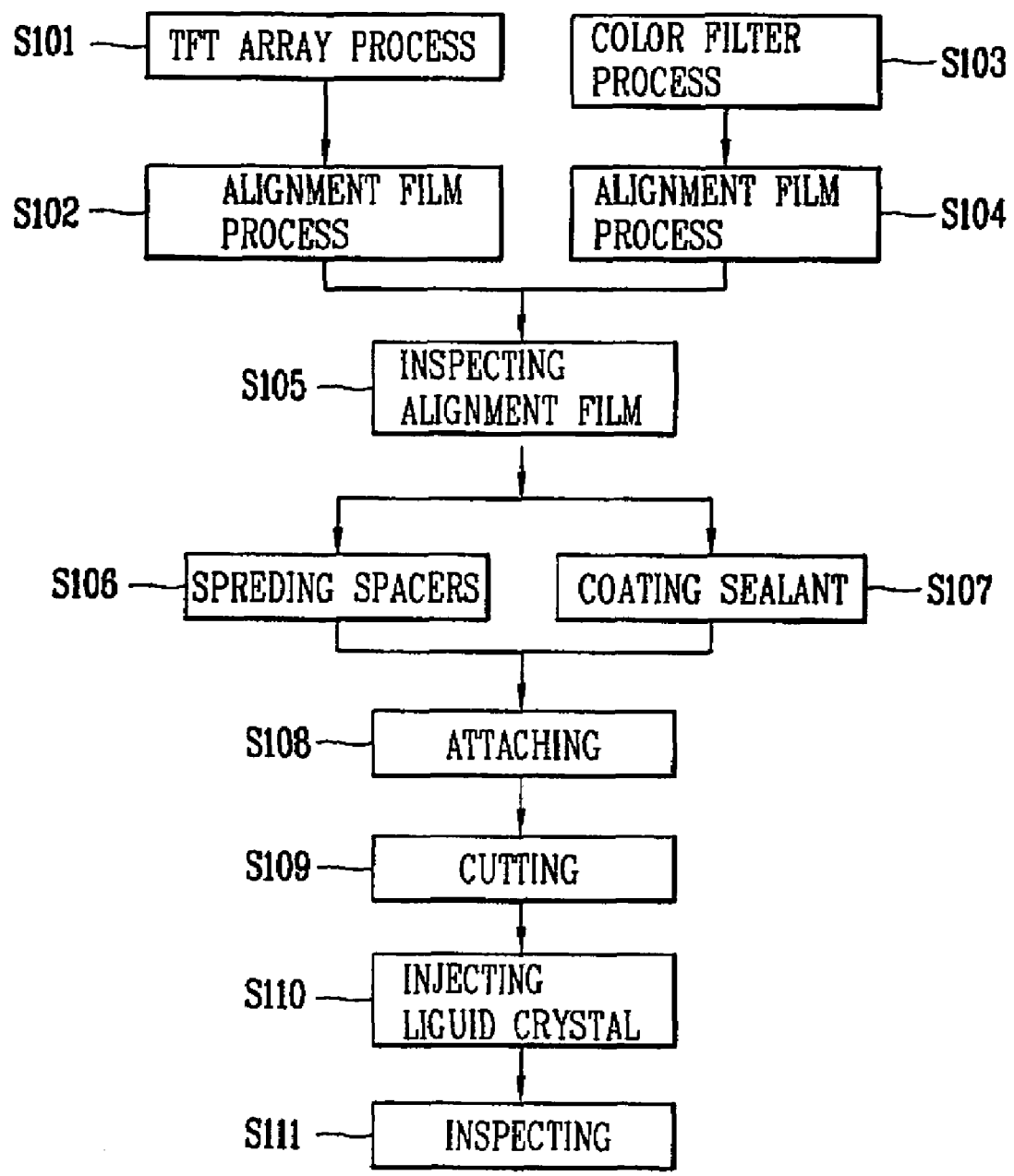
FIG. 6 is a flow chart illustrating the processes of one method for fabricating a liquid crystal display panel in accordance with the present invention.
Figure 7:
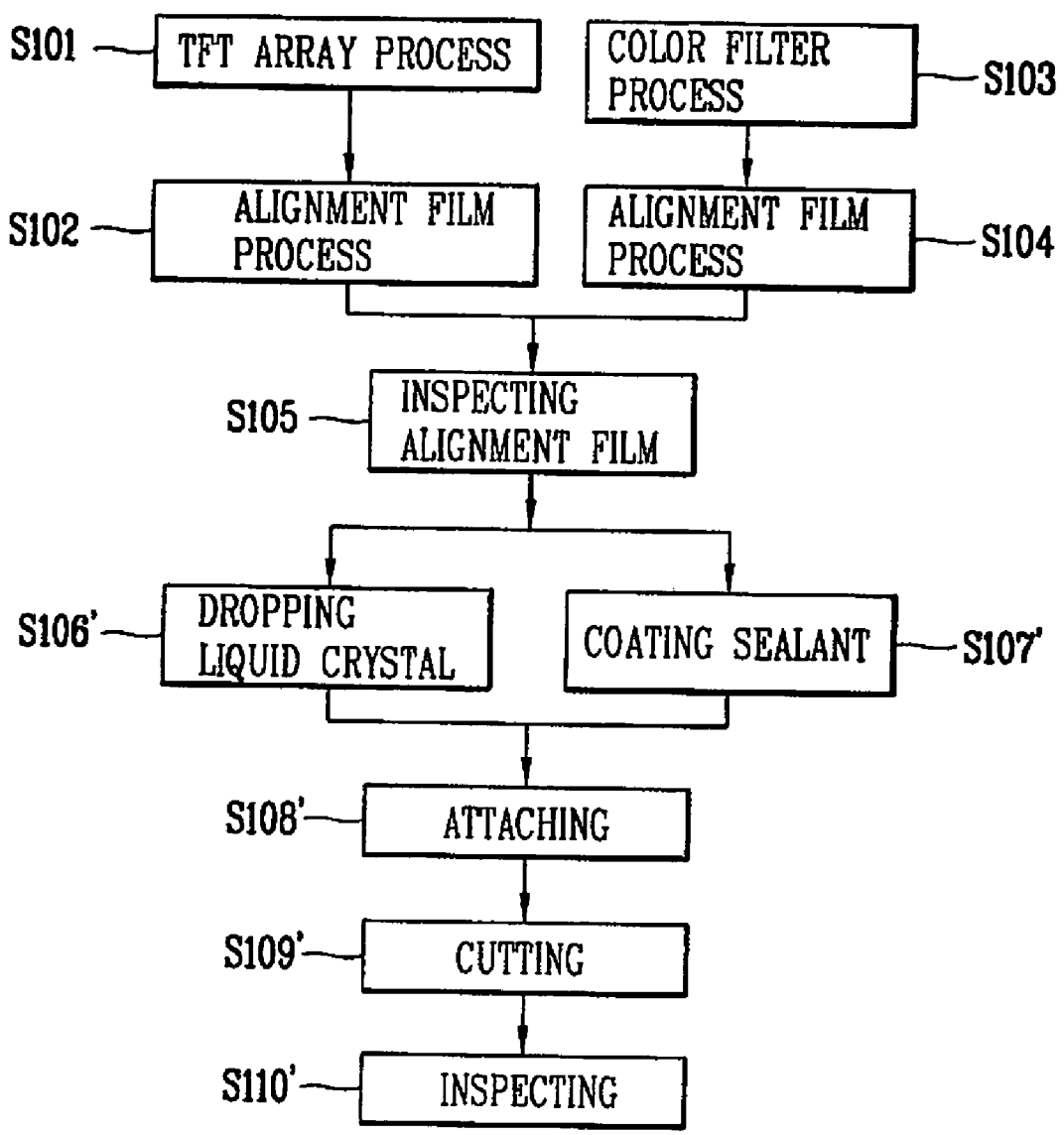
FIG. 7 is a flow chart illustrating the processes of another method for fabricating a liquid crystal display panel in accordance with the present invention.

FIG. 6 is a flow chart illustrating the processes of one method for fabricating a liquid crystal display panel in accordance with the present invention, and FIG. 7 is a flow chart illustrating the processes of another method for fabricating a liquid crystal display panel in accordance with the present invention.

Specifically, FIG. 6 illustrates a method for fabricating an LCD in which a liquid crystal layer is formed by a liquid crystal injection method, and FIG. 7 illustrates a method for fabricating an LCD in which a liquid crystal layer is formed by a liquid crystal dropping method.

The process for fabricating the liquid crystal display panel can be divided into a driving device array process for forming a driving device on the lower array substrates, a color filter process for forming a color filter on the upper color filter substrate, and a cell process for attaching the array substrate and the color filter substrate.

To begin with, a plurality of gate lines and a plurality of data lines arranged to define pixel regions on the lower substrate are formed and a TFT is formed connected to the gate lines and the data lines at each of the pixel regions through the array process (step S101). In addition, a pixel electrode connected with the TFT and drives the liquid crystal layer as a signal is applied thereto through the TFT is formed through the array process.

A color filter layer comprising red, green and blue sub-color filters implementing color and a common electrode are formed on the upper substrate through the color filter process (step S103).

Subsequently, after an alignment film is printed on the upper and lower substrates, it is aligned to provide an anchoring force or a surface fixing force (namely, a pretilt angle and an alignment direction) to liquid crystal molecules of a liquid crystal layer formed between the upper and lower substrates (step S102 and S104). In this case, for the alignment processing method, a rubbing method or photo alignment method can be used.

If the model of the liquid crystal display panel is changed so the current rubbing roll needs to be replaced by a different type of rubbing roll or if the current rubbing roll has been abraded so it needs to be replaced with a new rubbing roll, one of rubbing rolls kept in the roll stoker can be taken out for replacement and the rubbing process is continued. This will be described in detail as follows.

Figure 8:
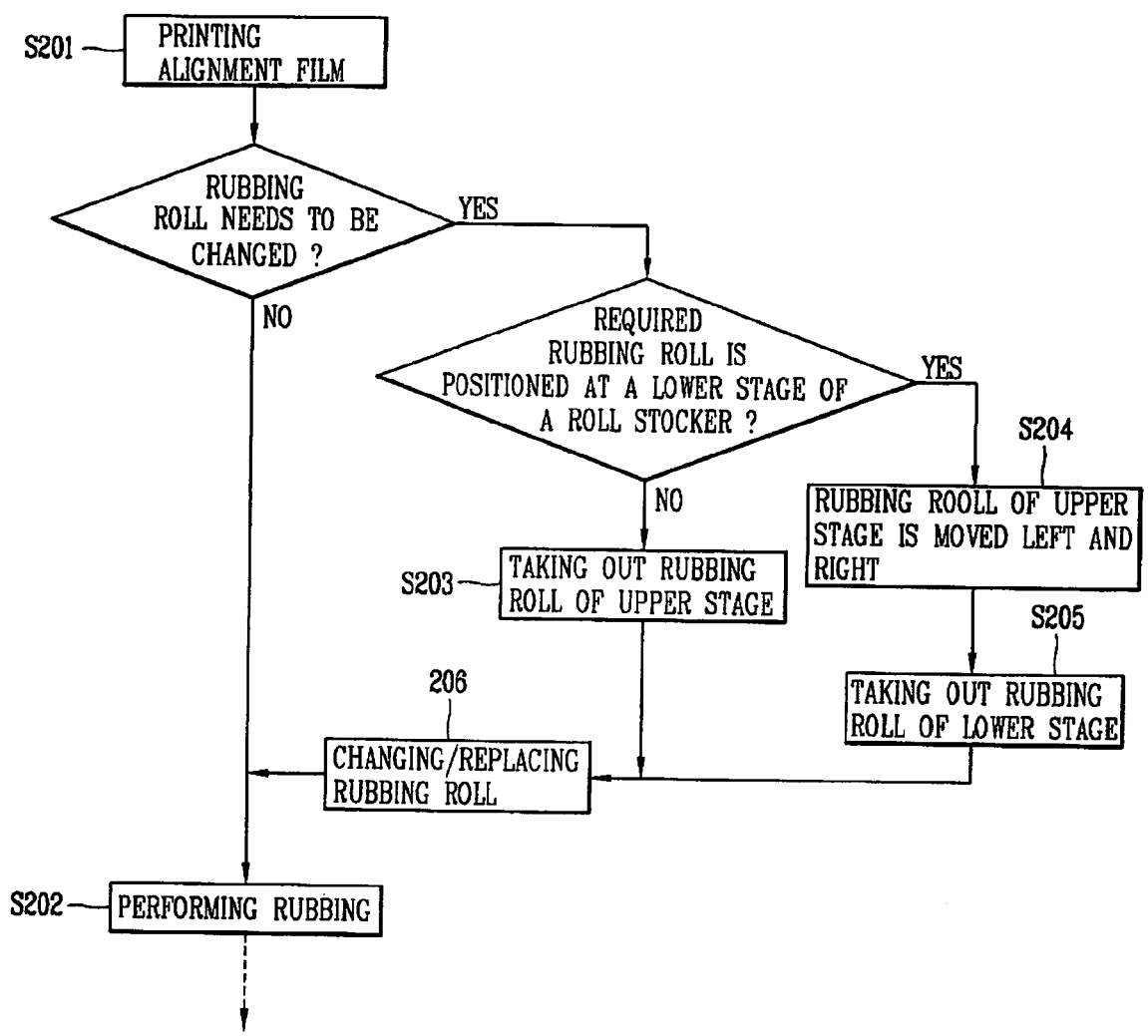
FIG. 8 is a flow chart illustrating the processes of a method for forming an alignment film in the method for fabricating the liquid crystal display panel in FIGS. 6 and 7 in accordance with the present invention.

FIG. 8 is a flow chart illustrating the processes of a method for forming an alignment film in the method for fabricating the liquid crystal display panel in FIGS. 6 and 7 in accordance with the present invention.

The liquid crystal display panel uses electro-optic effects of liquid crystal, and since the electric optical effect is determined by anisotropy of the liquid crystal itself and a state of arrangement of liquid crystal molecules, controlling of the arrangement of liquid crystal molecules has much influence on stabilization of a display quality of the liquid crystal display panel.

Accordingly, the alignment film forming process for effectively aligning liquid crystal molecules is of much importance with respect to characteristics of picture quality in the liquid crystal cell process.

First, an alignment film is printed on each of the upper and lower substrates which have been fabricated through the above-stated array process and the color filter process, and then rubbed to provide the anchoring force or the surface fixing force (namely, the pretilt angle and the alignment direction) to the liquid crystal molecules of the liquid crystal layer formed between the upper and lower substrates (steps S201 and S202).

In this case, the rubbing process refers to a process for arranging the alignment film in a certain direction so that the liquid crystals can be arranged in a certain direction by a rubbing cloth.

After the surface of the alignment film is rubbed, the surface of the alignment film has fine recesses.

As the rubbing cloth, a soft cloth is used, and the basic part of setting conditions for the rubbing process is setting a rubbing condition with a suitable strength and applying a uniform rubbing strength on a large area.

The rubbing cloth is formed such that the weft and the warp thread cross finely, and the surface of the rubbing cloth can be damaged by a pattern formed on the substrate or debris while the surfaces of the plurality of substrates are being rubbed.

Thus, when the alignment film is not uniformly rubbed because of a defective rubbing cloth surface, an alignment degree of liquid crystal molecules is not uniformed spatially, resulting in a defective alignment film with optical characteristics partially different.

While the rubbing process is being performed, if the rubbing roll has been abraded so as to be replaced with a new one or if the model of the liquid crystal display panel is changed so a different type of rubbing roll is required, a required rubbing roll is taken from the roll stocker to replace the current rubbing roll, and then, the rubbing process is continued (step S206).

In taking out the rubbing roll from the roll stocker, as mentioned above, if the required rubbing roll is positioned at the upper stage of the roll stocker, the operator can approach the roll keeping unit in which the required rubbing roll is kept, hold both end portions of the rubbing roll, and lift them up to thereby take out the rubbing roll (step S203).

Meanwhile, if the required rubbing roll is positioned at the lower stage of the roll stocker, the operator can move a roll keeping unit positioned above the required rubbing roll to an empty space in a horizontal direction and lift up the required rubbing roll from the lower stage to thereby take it out (steps S204 and S205).

After the rubbing process is finished through the above-described method, as illustrated in FIGS. 6 and 7, the upper and lower substrates are checked by an alignment film inspecting device as to whether their alignment films are defective or not (step S105).

For the alignment film inspecting device, a steam inspecting device can be used, which will be described in detail as follows.

In this embodiment of the present invention, the steam inspecting device includes a steam generator. The side of the mother substrate where the alignment film is formed is exposed to the steam generator so as to steam up, and then any non-uniformity such as a color change, a light and shade difference, or formed waterdrops are observed through observation equipment to thereby inspect uniformity of the alignment film. In this manner, the steam inspecting device in this embodiment performs the inspecting, so the inspecting process is simple and the process yield can be improved because the substrate is not damaged.

The inspecting of the alignment film using the steam inspecting device is performed in the following order.

First, the alignment film-formed substrate is positioned on the steam generator. In this case, the mother substrate is installed to be slanted at a certain angle, e.g., at about 40°~50°, toward the steam generator to facilitate steaming up and its observation.

And the steam generator heats distilled water at a certain temperature, e.g., at about 80° C.~100° C. to generate steam to make the alignment film of the substrate be steamed up.

And then, the steamed mother substrate is observed from the opposite side with the naked eyes or using the observation equipment, for example, a camera unit or the like, to observe non-uniformity such as a color change, a light and shade difference or formation of waterdrops, to thus check uniformity of the alignment film.

Through the inspecting, a fine defect or contamination by an impurity of the alignment film can be also checked. The above descriptions take the example of the case where the inspecting is performed after the rubbing process, but the inspecting can be performed before the rubbing process.

After inspecting on the alignment film is finished, as illustrated in FIG. 6, spacers for uniformly maintaining a cell gap are formed on the lower substrate and a sealant is coated on an outer edge of the upper substrate. And then, the lower and upper substrates are attached by applying a pressure thereto (steps S106~S108). In this case, the spacers can be ball spacers according to a spreading method, or can be columnar spacers formed through patterning.

The lower and upper substrates are formed on large-scale glass substrates. In other words, a plurality of panel regions are formed on the large-scale glass substrates, and the TFT, the switching device, and the color filter layer are formed at each panel region. Thus, in order to obtain a unit liquid crystal display panel, the glass substrates are to be cut and processed (step S109). Thereafter, liquid crystal is injected through a liquid crystal injection opening of each unit liquid crystal display panel, the liquid crystal injection opening is sealed to form a liquid crystal layer, and then, each unit liquid crystal display panel is inspected, thereby finishing fabrication of each of the unit liquid crystal display panels (steps S110 and S111).

The liquid crystal is injected in a vacuum injection method using a pressure difference. That is, in the vacuum injection method, the liquid crystal injection opening of the unit liquid crystal display panel separated from the large-scale mother substrates is put in a container filled with liquid crystal. The container is in a low-pressure or vacuum chamber, and then, the degree of vacuum is changed to allow liquid crystal to be injected into the liquid crystal display panel based on the pressure difference between the interior and the exterior of the liquid crystal display panel. When the liquid crystal is filled inside the liquid crystal display panel, the liquid crystal injection opening is sealed to form the liquid crystal layer of the liquid crystal display panel. Thus, in order to form the liquid crystal layer at the liquid crystal display panel through the vacuum injection method, a portion of a seal pattern needs to be opened to serve as the liquid crystal injection opening.

However, the vacuum injection method has the following problem. First, it takes a long time to fill the liquid crystal in the liquid crystal display panel. In general, since the attached liquid crystal display panel has an area of hundreds of cm$^2$ and a gap of merely about a few μm, the amount of injected liquid crystal per unit hour is inevitably small when the vacuum injection method using the pressure difference is employed. For example, about 8 hours are required for filling liquid crystal for fabricating an about 15-inch liquid crystal display panel. That is, since that much time is required for fabrication of the liquid crystal display panel, the productivity is degraded. In addition, as the liquid crystal display panel is increased in size, time taken for filling liquid crystal would be more lengthened and a defective filling of liquid crystal would also occur, resulting in that it cannot cope with the enlargement of the liquid crystal display panel.

Second, a large amount of liquid crystal is used. In general, the amount of liquid crystal actually injected into the liquid crystal display panel is quite small compared to the amount of liquid crystal in the container. Furthermore, when liquid crystal is exposed to the air or exposed to a specific gas, it reacts to the gas and degrades. Thus, although the liquid crystal filled in the container fills the plurality of unit liquid crystal display panels, a large amount of liquid crystal remaining after finishing the filling is discarded, and accordingly, the unit cost of the liquid crystal panel is increased only to weaken price competitiveness of the product.

In order to solve the problem of the vacuum injection method, the dropping method is increasingly employed.

As illustrated in FIG. 7, in the dropping method, after the alignment film is inspected (step S105), a certain seal pattern is formed with a sealant on the color filter substrate and, at the same time, a liquid crystal layer is formed on the array substrate (steps S106' and S107').

According to the dropping method, after liquid crystal is dropped and dispensed on the large-scale first mother substrate where a plurality of array substrates are disposed or on an image display region of the second mother substrate where the plurality of color filter substrates are disposed, the first and second mother substrates are attached by applying a certain pressure thereto to thereby make the liquid crystal uniformly distributed to the entire image display region and thus form a liquid crystal layer.

Thus, when the liquid crystal layer is formed in the liquid crystal display panel through the dropping method, the seal pattern must be formed as a closed pattern surrounding the outer edge of the pixel part region in order to prevent a leakage of liquid crystal to outside of the image display region.

The dropping method allows dropping of liquid crystal within a relatively short time compared with the vacuum injection method and can quickly form the liquid crystal even when the liquid crystal display panel is large.

In addition, since only the required amount of liquid crystal is dropped on the substrate, the unit cost of the liquid crystal display panel according to discarding of the high-priced liquid crystal as in the vacuum injection method does not increase, and thus, the price competitiveness of the product can be enhanced.

Thereafter, in a state that the upper and lower substrates on which liquid crystal has been dropped and the sealant has been coated are aligned, a pressure is applied thereto to make the lower and upper substrate attached by the sealant and simultaneously the dropped liquid crystal spread uniformly on the entire portion of the panel (step S108').

Through the process, the plurality of liquid crystal display panels with the liquid crystal layer formed thereon are formed on the large-scale glass substrates (upper and lower substrates). The glass substrates are processed and cut to be separated into the plurality of liquid crystal display panels, which are then inspected to thereby finish fabrication of the liquid crystal display panel (steps S109' and S110').

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display device comprising:

providing mother substrates each having a plurality of array substrates or a plurality of color filter substrates formed thereon;

performing an array process on the array substrates and performing a color filter process on the color filter substrates;

forming an alignment film on a surface of the mother substrate;

performing rubbing on the mother substrate with the alignment film formed thereon using a rubbing equipment;

taking out a required rubbing roll from a roll stocker, which includes an upper stage installed at an upper side of a lower stage used as a support, a plurality of roll keeping units positioned at the upper and lower stages and keeping rubbing rolls and a moving unit installed between the upper and lower stages and moving the roll keeping unit of the upper stage, in order to replace an existing rubbing roll, as necessary, and continuously performing a rubbing process;

attaching the pair of rubbing process-finished mother substrates; and cutting the attached mother substrates into a plurality of unit liquid crystal display panels.

2. The method of claim 1, wherein the moving unit moves the roll keeping unit of the upper stage in a horizontal direction.

3. The method of claim 1, wherein, in the step of forming the alignment film, the alignment film is printed on the surface of the mother substrate using a printing unit.

4. The method of claim 3, wherein the upper stage includes an empty space where a roll keeping unit is not positioned to allow the roll keeping units of the upper stage to be movable to an empty space left or right.

5. The method of claim 1, wherein if a rubbing roll kept in a roll keeping unit of the lower stage is required, a corresponding upper roll keeping unit of the upper stage positioned at an upper portion of the required rubbing roll of the lower stage is moved to a left or right empty space, and then, the required rubbing roll of the lower stage is lifted up to be taken out.

6. The method of claim 1, wherein liquid crystal is dropped on one of the rubbing process-finished array substrate or color filter substrate, and a sealant is coated on the other substrate.

7. The method of claim 6, wherein the liquid crystal-dropped substrate and the sealant-coated substrate are attached.

8. The method of claim 1, wherein a pair of rollers for periodically rotating rolls kept in the roll keeping units are additionally included.

9. The method of claim 1, wherein spacers are formed on either one of a mother substrate for the rubbing-finished array substrate and a mother substrate for the rubbing-finished color filter substrate, and a sealant is coated on the other mother substrate.

10. The method of claim 9, wherein the spacer-formed mother substrate and the sealant-coated mother substrate are attached.

11. The method of claim 10, wherein the attached mother substrates are cut into a plurality of liquid crystal display panels and then liquid crystal is injected into the liquid crystal display panels.

* * * * *